United States Patent [19]

Sobczak

[11] Patent Number: 5,582,718
[45] Date of Patent: Dec. 10, 1996

[54] NON-PRESSURIZED ALGAECIDE FEEDER METHOD AND APPARATUS FOR SWIMMING POOLS AND THE LIKE

[76] Inventor: Donald J. Sobczak, 3104 W. Mangold Ave., Greenfield, Wis. 53221

[21] Appl. No.: 259,399

[22] Filed: Jun. 14, 1994

[51] Int. Cl.⁶ ............................................. C02F 1/50
[52] U.S. Cl. ................ 210/136; 210/169; 210/198.1; 222/630; 222/637
[58] Field of Search .................................. 210/169, 136, 210/198.1; 222/630, 637

[56] References Cited

U.S. PATENT DOCUMENTS

| | | | |
|---|---|---|---|
| 1,103,786 | 7/1914 | Lewis . | |
| 1,205,513 | 11/1916 | Carlson | 210/198.1 |
| 1,632,806 | 6/1927 | Smith . | |
| 2,012,406 | 8/1935 | Savell | 210/198.1 |
| 2,227,646 | 1/1941 | Hillmann | 299/84 |
| 2,678,541 | 5/1954 | Sheen | 210/198.1 |
| 2,739,738 | 3/1956 | Jauch et al. | 222/133 |
| 2,785,012 | 3/1957 | Frewin | 299/84 |
| 3,867,290 | 2/1975 | Mackey | 210/169 |
| 3,976,250 | 8/1976 | Bentzinger | 239/533 |
| 4,115,270 | 9/1978 | Phillips | 210/169 |
| 4,193,520 | 3/1980 | Duffield | 222/630 |
| 4,297,223 | 10/1981 | Rivenbark | 210/205 |
| 4,339,332 | 7/1982 | Jasperson | 210/198.1 |
| 4,340,078 | 7/1982 | Pasley | 137/205.5 |
| 4,610,848 | 9/1986 | Weber | 210/198.1 |
| 4,722,460 | 2/1988 | Madsen | 222/174 |
| 4,935,116 | 6/1990 | LeMire | 204/237 |

FOREIGN PATENT DOCUMENTS 0164897  12/1985  European Pat. Off. ............ 210/198.1

*Primary Examiner*—Neil McCarthy
*Attorney, Agent, or Firm*—Andrus, Sceales, Starke & Sawall

[57] ABSTRACT

A liquid algaecide solution in a replaceable bottle is connected in a non-pressurized connection to the water recirculation line of the swimming pool; at the input side of the pump. A flow control unit and a siphon check valve unit in a feed line connects the bottom of the bottle to the recirculation line. The algaecide solution bottle is releasably coupled to the feed line for gravity flow. The control unit has a manual control to vary the flow rate and the check valve unit permits only flow into the recirculation line. The bottle is releasably mounted to a pipe of the recirculation line. Commercially available solution bottles have a thread output neck. The control unit has a threaded cap connected to the bottle neck, and the upper end of the bottle has a small opening for gravity flow therefrom. The control unit has a dial control valve for selectively opening a metered passageway for precise discharge of the liquid solution and a flexible line connects the control unit to the check valve unit. The check valve unit is spring-biased to a closed state, and responds to the recirculating water in the recirculation line to open for gravity flow of the algaecide liquid solution through the control valve and the check valve into the recirculation line. The check valve unit is secured by a pressure fit within a drilled opening and an encircling clamp unit, unit with a depending discharge pipe for siphoning of the liquid solution into the recirculating pool water.

11 Claims, 3 Drawing Sheets

NON-PRESSURIZED ALGAECIDE FEEDER METHOD AND APPARATUS FOR SWIMMING POOLS AND THE LIKE

BACKGROUND OF THE INVENTION

The present invention relates to a non-pressurized algaecide feeder for treatment of water in a swimming pool or like body of water for swimming and the like, and in particular providing a controlled feed of a liquid algaecide with the recirculation of filtered pool water.

Swimming pools, large hot tub units and like pool units are widely used in both commercial installations, residential and domestic installations and the like. It is important to treat the water for health purposes and particularly to prevent the growth of bacteria and other foreign matter within the water. Conventionally, the water is treated by manual addition of chlorine and a suitable algaecide, and particularly a conventional algaecide, such as copper sulfate which functions to kill algae. It is important to control the quantity of algaecide rather accurately in order to maintain effective treatment of the water without adversely effecting the character of the water for purposes of use by humans. Presently, the algaecide in the form of liquid, granular, and tablets are manually added to the pool water with a controlled distribution and disintegration during feeding. If the appropriate amount of the algaecide is not appropriately fed and added to the water, it will adversely effect the esthetics of the pool. For example, if an excessive amount of algae exists, it tends to discolor the liner, the concrete or the other base surface of the pool.

Chlorine and similar acids have been fed through pressurized injector valve units. For example, a "Bromidater" is sold by the Hayward Company for the introduction of chlorine and other acid like materials. Such systems require relatively expensive components. A prior art water algae purification device for swimming pools and the like is disclosed in U.S. Pat. No. 4,935,116 which issued Jun. 19, 1990 and discloses a special electrical voltage cell unit supplying silver and copper ions to swimming pool water with the water being fed to the pool with the filtered water. Therefore, various liquid feeding systems have been used in many other applications, algaecide feed has universally to the knowledge of the inventors involved, manual addition of algaecide in various forms to the water.

Although heavy chlorine and like sanitizer materials are often used and even required in commercial-type pools available to various members of the public may also attack algae, the heavy dosage used is not generally found acceptable in private pools and often in pools available to the public. Further, if a pool is used by a substantial number of people, chlorine may not avoid algae formation in the pool. In private smaller pools, algaecide addition is generally the protective process used to control and prevent algae growth. A further advantage of algaecide use is it's continued effectiveness when exposed to sunlight. Thus, the ultraviolet energy of the sun may destroy the effectiveness of sanitizer such as chlorine and ammonia based materials, but does not adversely affect algaecide materials.

Algae may rapidly develop within a pool which is not properly maintained. Algae within a pool tends to stain the surface to which engages. Once created, the algae must be killed using chlorine, with or without an algaecide, and the surface then mechanically cleaned using a brush or the like. The cleaning process is time consuming, and costly. Thus, costs in hundreds of dollars may result in severe cases and particularly if the pool must be drained for proper cleaning of algae. Further, if not cleaned promptly and thoroughly, the surface may be permanently stained; with an aesthetic damaged surface. Generally, pool owners personally, or through a regular custom service by a pool maintenance service, manually introduce a algaecide into the pool water. The effectiveness is directly related to the proper attention to the addition of the algaecide as required, which requires a conscious effort on the part of the pool owner. The required algaecide additions must be regularly attended to, depending upon the environment. Thus, various algae spoors are present in the air, and the rate of algae formation varies with environmental conditions such as temperature and rain as well as the use of the pool. The amount of algaecide required will thus vary with the conditions for growth, the size of the pool and the particular algaecide used. Thus, the algaecide may be purchased as solid granules or in a water solution of varying concentrations. Typical heaviest solutions includes 60 to 70 percent water and the balance an algaecide, although the inventor has found that solution with 2½ to 5 percent algaecide are satisfactory for treating pools where algaecide is added frequently. The cost for good quality solution are generally in the range of fifteen to twenty dollars a quart.

There is a need however for a very simple, reliable and cost effective automated system of feeding algaecide to the water for use in swimming pools, spas and other similar pool facilities used by various people.

SUMMARY OF THE PRESENT INVENTION

The present invention is particularly directed to an inexpensive but reliable non-pressurized liquid source of liquid algaecide having an output control unit and a check valve siphon unit connected to the recirculation line of the pool unit. The algaecide is held in a replaceable bottle or like container which is releasably coupled to a feed line for gravity flow from the bottle. A dial control valve unit provides for varying the flow of liquid algaecide to a check valve unit which in turn directs the liquid algaecide into the water recirculation line. In a preferred and unique feature and embodiment of the present invention, the algaecide source is an appropriate bottle of liquid algaecide. The algaecide bottle is preferably a standard bottle which is commercially marketed through retail stores with an outlet or a discharge threaded neck for direct threading and attachment to a valve cap. The bottle is releasably mounted above the water recirculating line. The bottom discharge outlet is a standard threaded bottle neck. The feeder unit includes a threaded cap, preferably forming a part of a control valve assembly, to receive the bottle neck with a fluid tight connection therebetween. The upper end of the bottle is formed with a small opening to provide the source as a non-pressurized liquid supply. The control valve is preferably a simple dial type control valve for selectively opening and closing a metered passageway which provides accurate adjustment of the flow through the unit under normal flow rates of the recirculating pump system. A flexible line connects the control valve to the check valve unit having an outlet conduit which is mounted within an opening in the flow pipe of the recirculation water system. The check valve unit is biased closed as by a resilient member such as a spring or the like. The spring is set to respond to the recirculating water in the flow pipe to selectively open the check valve unit and thereby allow the gravity flow of liquid through the control valve and the check valve into the flow line or pipe.

In a practical construction, the check valve is coupled by a simple pressure fit within a drilled opening into the recirculation pipe wall. A clamp unit or the like secures the unit to the pipe with a liquid tight connection and with the injector projecting into the pipe to provide a simple, reliable and effective connection to the pipe.

in accordance with a preferred and a unique feature and embodiment of the present invention, the check valve unit is secured to the infeed side of the pool pump unit with the algaecide selected as a non-foaming and non-corrosive algaecide. The algaecide thus is thoroughly mixed with the recirculating water within the pool pump, as the water is withdrawn from the pool to be passed through the filter unit and discharged into a return line to the pool. Applicant has found that this location of the algaecide feeder system provides an improved operation and feeding of the algaecide to the pool. Thus, the algaecide is added with the water upstream of the filter, thoroughly mixed and then discharged through the filter and the plurality of return line portions of the recycling system.

The present invention is thus particularly directed to a non-pressurized algaecide feeding system in which a reasonably accurate flow of algaecide is provided without the necessity of necessarily high precision requirements.

In summary, the present invention provides a non-pressurized algaecide feeder using readily available components and based on a siphon responsive system for opening of the flow and establishing of proper flow into the recycled water, and preferably to the input side of the pump unit.

The system is readily constructed with present mass produced devices. The present invention in particular provides a highly simple, cost-effective algaecide feeder which provides the proper feed of algaecide to swimming pools, tubs, spas and the pool like.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the Drawings:

FIG. 4 is a fragmentary view of the portion of FIG. 1 showing an alternate placement of the algaecide feeder assembly from that as shown in FIGS. 1 and 2.

DESCRIPTION OF THE ILLUSTRATED EMBODIMENT

The off line algaecide feeder system of the present invention is particularly designed for controlled application of liquid algaecide to a swimming pool, and particularly residential pools. Typical requirements require application of the algaecide as low as one ounce in twenty-four hours of filter operation but may range many times such rates.

Figure 1:
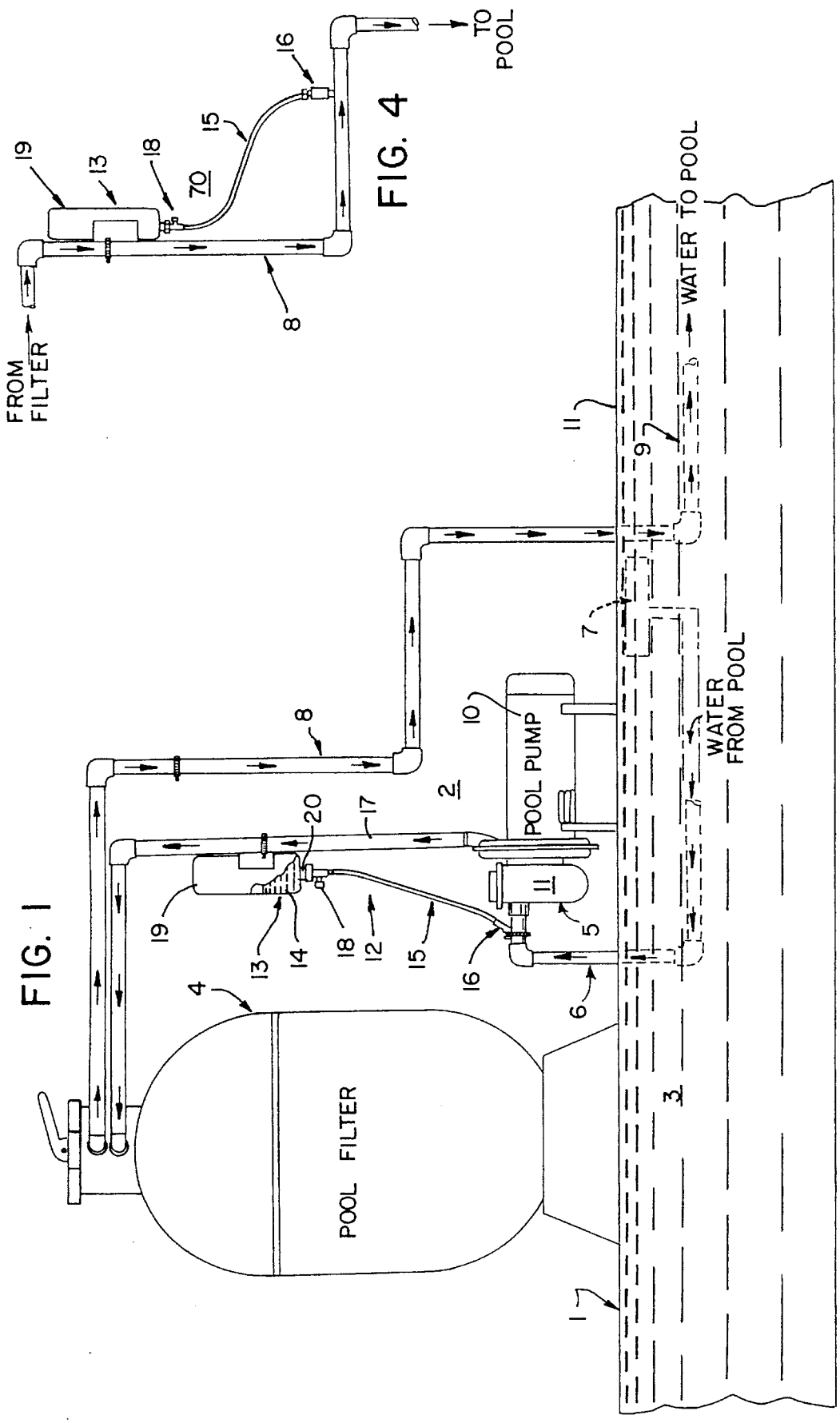
FIG. 1 is a diagrammatic elevational view of a water recycling and purifying system for a swimming pool or the like illustrating a preferred embodiment of the present invention.

Referring to the drawings and particularly to FIG. 1, a pool 1, such as a swimming pool, is shown in a fragmentary illustration with a water recycling apparatus 2 diagrammatically illustrated for recirculation of the water 3 from the pool 1, through a filter unit 4 and back to the pool 1. The recirculating apparatus is of a well known construction and generally includes a motor driven pump unit 5 having an inlet pipe or line 6 coupled to at least one pool outlet 7, generally at the upper surface of the pool. The water 3 is pumped from the pool 1 into a relatively large filter unit 4, within which the water is clarified and returned through a return line 8 to the pool to an outlet 9. The return line 8 will discharge water generally through a plurality of pool inlets, only one of which is shown at 9 for purposes of description. Thus, an interconnection of a plurality of distribution lines, not shown, may be provided through a header, not shown, which coupled to the return line 8. The pump unit 5 may be a conventional centrifugal motor driven pump assembly including a drive motor 10 connected to a pump 11 to provide positive movement of the water from the pool through the filter unit 4 and back to the pool, with the algaecide solution thoroughly mixed and distributed throughout the recycled water and thereby throughout the pool. Such systems are well known and are widely used in swimming pool applications. The pump unit 5 and filter unit 4 is shown at ground or top level of pool, but may be located either above or below the bottom or floor 10 of the pool 1. If below the floor level, the outlet pressure of the pump unit 5 must be sufficiently great to raise the water upwardly into and through the various returning distribution lines. If mounted above the floor level, the pumping load is generally significantly less, and requires a smaller pump unit. Further, pumping capacity of the pump unit 5 is directly related to the pool size. For residential pools, ¾ to 1 horsepower pump units are typical, while 5 horsepower pump units may be required for large pools more generally available to the public. In private pools, the pump units specification may only require a recirculation flow of 50 gallons per minute, in order to complete recycle and clarify the water on an average of 1½ times each day. Such systems are well known and readily provided in accordance with well known technology.

The present invention is particularly directed to an off-line, non-pressurized liquid algaecide feeder unit or system 12 having a non-pressurized supply unit 13 of an algaecide solution 14, coupled through an algaecide feed line 15 to a check valve unit 16. The unit 12 is connected to the in-feed or inlet line 6 to the inlet of pump 11, which has a discharge line 17 connected to filter unit 4. A manual control valve unit 18 is connected in the feed line 15 between the replaceable supply unit 13 and the check valve unit 16 for controlling the rate of feed of the liquid algaecide solution to the check valve 16 and thereby to pool 1 in response to operation of the pool pump unit 5.

In the illustrated operation of the system, the appropriate liquid algaecide supply unit 13 is mounted adjacent the filter system 3 and discharges the solution 14 under gravity forces into and through the control valve unit 18 for controlled flow through the check valve unit 16 in response to the recirculating water flow. The check valve unit 16 is normally closed to isolate the algaecide outlet system from the flow line, such that the pool water cannot escape through line and the algaecide feed system. Upon operation of the pool pump, water is drawn from the pool under a selected pressure and flow rate. The flow rate is sufficient to open the check valve unit 16 and allows a metered amount of the liquid algaecide 14 to flow through the feeder system, valve unit 18 and 16 into the clarified water as it moves into the pump unit 5.

The use of a liquid algaecide solution 14 eliminates the probability of clogging the system and permits accurate metered discharge of algaecide into the water during recirculation. The algaecide may be readily purchased in solution form or may be a solid which is changed to a solution for use in the present invention.

Figure 2:
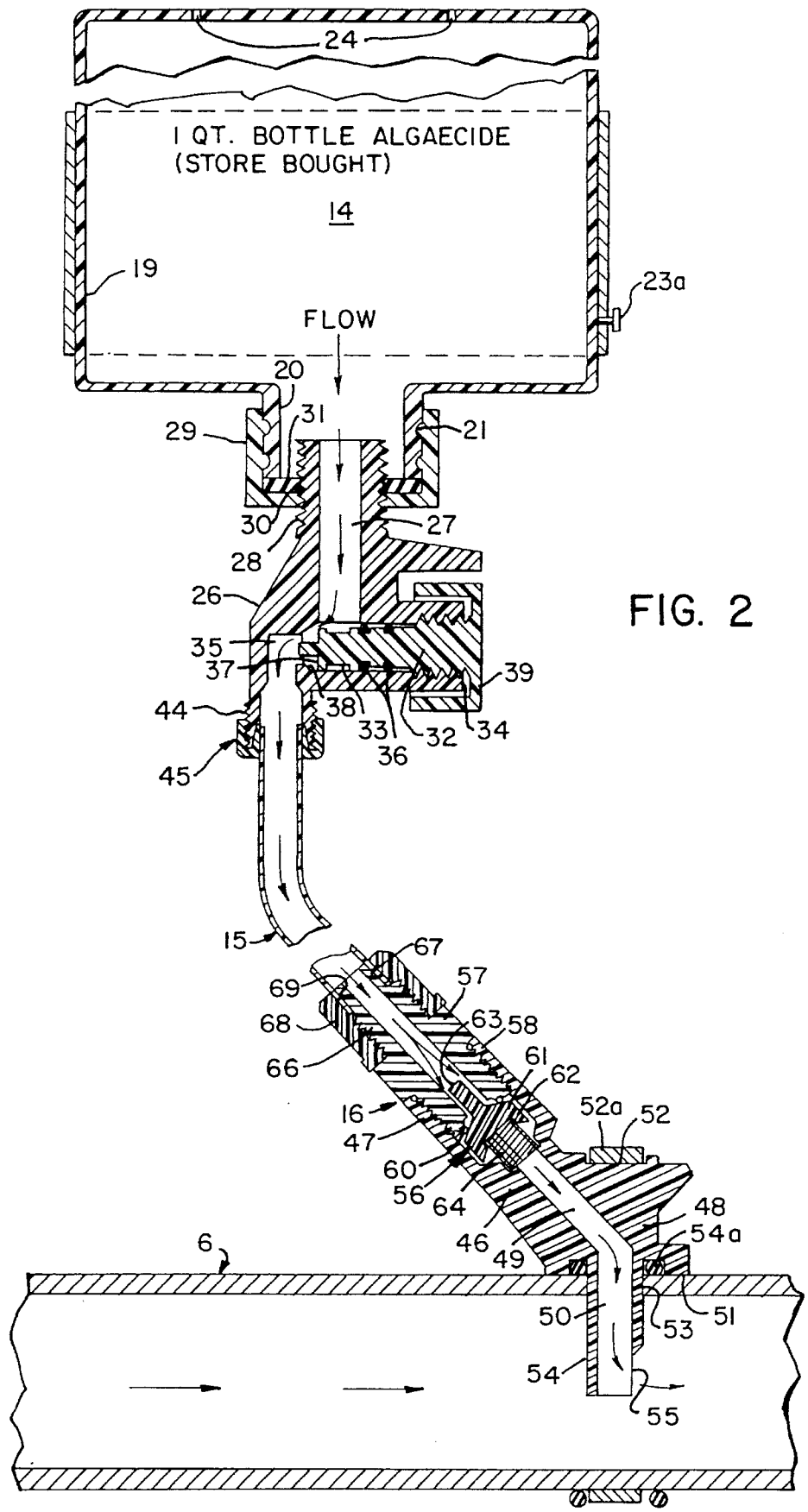
FIG. 2 is an enlarged view with the algaecide feeding system shown in FIG. 1, with the operative components in a vertical section.
Figure 3:
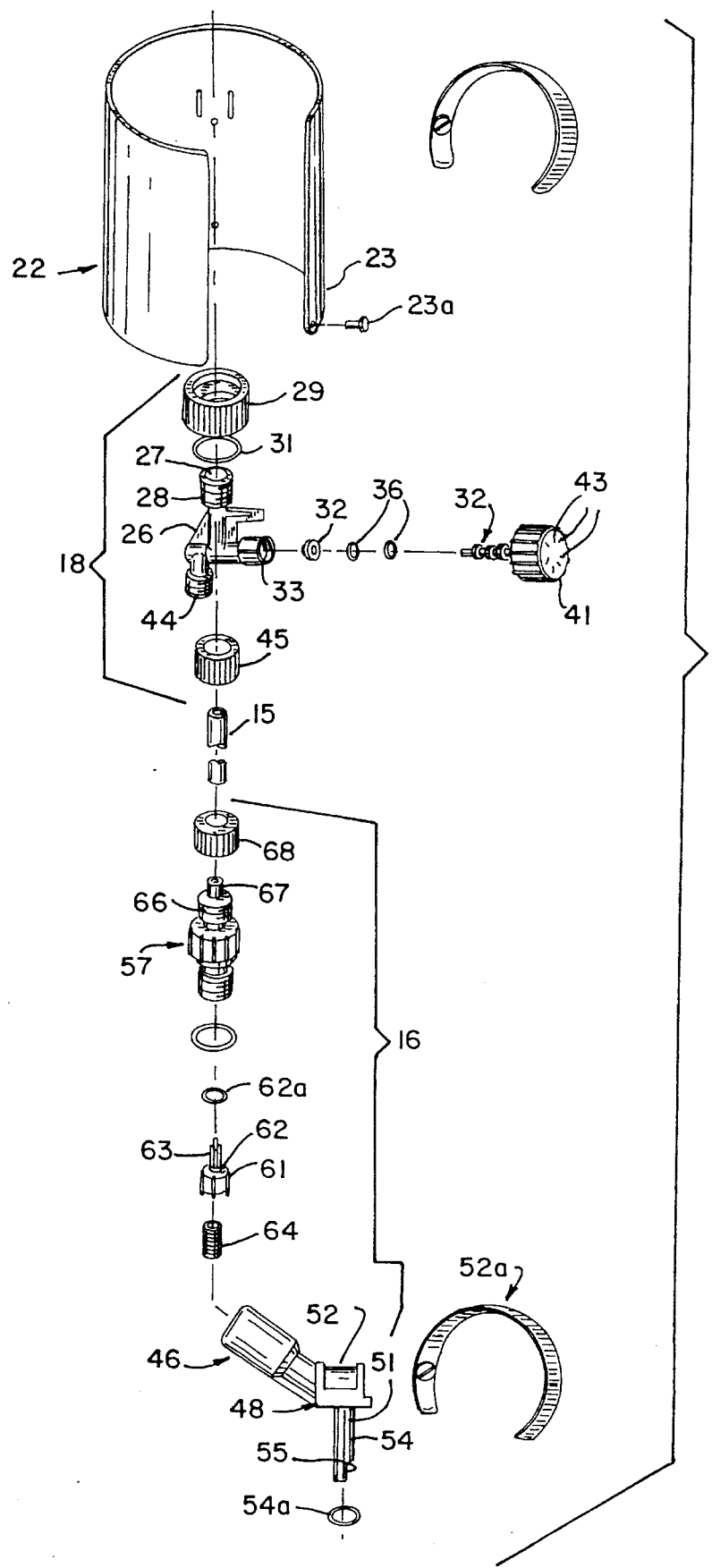
FIG. 3 is an exploded elevational view of the several components shown in FIGS. 1 and 2 of the algaecide feeder unit.

More particularly and with reference to FIGS. 2 and 3, the illustrated embodiment of the invention, the algaecide supply unit 13 includes a conveniently purchased and conventional bottle 19 of the algaecide solution 14. Such bottles are readily commercially available in various retail establishments, generally in a one quart or 1 gallon size. The bottle for different sizes has a discharge neck 20 normally sealed with a conventional threaded cap, not shown. The neck size is standard for the different size bottles 19 and has the identical connecting thread 21.

In accordance with the present invention, a separate holder or support 22 is provided to mount bottle 19 on a pipe shown, as line 17, of the recirculating system. The illustrated support structure 22 includes an adjustable split tubular U-shaped shell 23 secured to pipe 17 by a band clamp 23a secured about the back wall of the bottle support shell 23 and pipe 17. Tightening of the clamp firmly secures the bottle 19 and support to pipe 17. The U-shaped shell 23 is a simple metal or plastic member having a diameter which deflect and firmly engage the sidewall of the bottle 19. A simple securement screw 23a may be threaded into the outer edge of the U-shaped support for replaceable mounting of the bottle 19 within the bottle holder.

In the supported position, bottle 19 is held in an inverted position with the neck 20 of the bottle 19 projecting downwardly into connection the line 15, and in particular to the flow control valve unit 18 in the illustrated embodiment of the invention. Relatively, one or two small openings 24 are inserted into the upper end of the bottle 19, and shown in the base or bottom wall 25 (FIG. 3) of the bottle. This establishes and maintains gravity flow from the bottle.

The control valve unit 18 is based on an available valve unit sold by Hayward Corporation for use in connection with feeding of bromine and the like materials to an indoor pool. The unit is generally formed of plastic body members having an ABS plastic body and control valve stem. The material is a semi-rigid material to provide a highly satisfactory long-life valve assembly.

Referring to FIGS. 2 and 3, the control valve unit 18 includes a valve body 26 having a vertical passageway 27. The upper end of the valve body 26 is a tubular threaded member 28. A threaded cap 29 has a central threaded opening which is secured to the threaded end member 28 with a suitable adhesive 30 interposed between the mating threads. The cup-shaped cap 29 is thus formed as an integrated part of the valve body 26 with an essentially fluid tight joint therebetween. The cap 29 may be formed of polypropylene which is readily adhesively bonded to the inlet neck 28 of the valve body 26. The cap 29 has the sidewall threaded to match the standard threads 21 on the neck 20 of the bottle 19 and the bottle is threaded into the cap. A rubber or other sealing gasket 31 is interposed between the base wall of the cap 29 and the end edge of the neck 20 to provide a liquid tight connection of the bottle 19 to the valve body 26.

The illustrated valve body 26 includes an offset in the passageway 27. A laterally extended valve stem 32 is threaded within a lateral opening 33, as at 34 in the body. The inner end of valve stem 32 projects inwardly into the offset passageway 35 with suitable O-ring seal members 36 sealing the stem 32 within the lateral passageway 33 for adjustable positioning of the valve stem 32. The innermost end of the valve stem 32 includes a flat end wall 37 adapted to be adjustably positioned with respect to a conical valve seat 38 formed within the outlet side or end of lateral passageway 33 immediately adjacent to a vertical passageway 38a. The outer end of the valve stem 32 includes a manually positioned knob 39 for manual setting of the valve within the valve body. The valve body 26 has an overlying lateral projection 40 aligned with and extended over the knob 39. The projection 40 defines a reference position for a single turn of the valve knob. The knob face 41 includes angle setting indicia 43, such as numbers, for reading of the position of the valve stem 32 between fully closed and fully open position. Gradations in the indicia 43 are preferably made in relationship to one ounce per twenty-four hours of filter operation, as more fully developed hereinafter. In typical residential pools such as 12×24 feet to a 16×32 feet perimeter, the algaecide solution may be added at a rate of 40 to 50 drops an hour to provide an addition of 1 ounce per 24 hour period during the pool usage periods. The exact additive flow rate may be readily controlled by the pool owner based on experience with different additive rates and in formation readily available from experienced service and supplier personnel.

The bottom or lower end of the valve body 26 includes a tubular threaded coupling 44 coaxial with and forming a part of the bottom of the valved passageway.

Flexible flow line 15 is secured by a threaded compression nut 45 to the discharge coupling 44 and provides for connection of the bottle 19 and valve unit 18 to the check valve injector unit 16. Thus, the flexible line 15 may be formed of a suitable vinyl plastic or the like and is preferably a clear plastic such that a visual indication clearly indicate the flow or lack thereof of the liquid solution 14 from bottle 19.

The check valve injector unit 16 permits flow of solution 14 from line 15 while preventing backflow of the recycled water in the recycling line or pipe 6 into the algaecide unit.

The injector valve unit 16 is a generally known valve structure made by Blue & White Inc. and used in connection with various other pressurized flow systems. The valve unit 16 includes a valve body 46 having a tubular inlet end 47 and an offset discharge end 48. A passageway 49 extends through end 47 into the discharge end which includes a lateral offset portion 50. The discharge end 48 has a curved mount face 51 adapted to abut the wall of the pump intake pipe 6. The outer wall 52 of the abutment is formed with a circular face. A clamping band 52a is secured about the pipe 6 and the outer wall to fixedly secure the valve body 46 abutting the pipe 6 in alignment with a pipe opening 53. A discharge nozzle or tube 54 projects from the pipe abutting inner face 51 of the abutment and projects inwardly through the opening 53 in the intake pipe 6. An O-ring seal 54a encircles tube 53 and is located within a recessed portion in the inner face of the abutment. The discharge tube 54 terminates generally at the center of pipe 6, with a downstream portion thereof removed as at 55. The valve is thus clamped into sealing engagement by tightening of the encircling band such as a conventional bolted band structure.

The tubular inlet end of valve body 46 projects upwardly and laterally from the discharge portion terminating at the outer end in an internally threaded tubular end having an enlarged bore, within which a check valve unit 56 is located.

Referring to FIG. 2, check valve body 57 is threaded within the enlarged bore as at 58 and spaced from the base of the bore. The inner end of the valve body 57 includes a chamfered or conical recess defining a valve seat 60. A check valve stem 61 is located within the enlarged bore between valve seat 60 and the base of the bore 58. The stem 61 includes a tapered valve seat 62 located in opposed relation to the fixed valve seat 60. An O-ring seal 62a is inserted in the valve seat structure. The valve stem 61 includes a rod-like guide 63 projecting into the passageway of the body 57. The inner end of valve stem 61 is cup-shaped with a coil spring 64 acting between the base of the enlarged bore and the opposed face of base of the valve stem. The spring 64 and water pressure in line 6 urges the valve seat 62 outwardly into firm sealing engagement with the valve seat 60, without flow through line 6. Thus, the valve unit 16 is normally and positively closed by spring 64, as a result of a non-pressurized state of the algaecide supply bottle 19.

The outer end of the body 57 extends outwardly of body 47, and has an external threaded portion 66 with a tapered end wall 67. A nut 68 threads onto portion 66 with a mating, inner tapered wall 69 and clamps the outer end of tube 15 to the valve unit 16.

With the pool pump unit 5 operating, the water flows pass the inwardly projecting discharge tube 53, creating a suction force on the inner end 55 of the discharge tube. The force is sufficiently great to open the check valve unit 16 and permit the flow of the algaecide solution from the bottle under the gravity forces through the control valve unit 18 and the valve unit 16 into the center of the intake pipe 6. The algaecide solution 14 is thus carried with the water into the inlet side of the pump unit 5. The algaecide solution is thoroughly intermixed with the water within the pump unit 5 and discharged through the line or pipe 17 to the clarifying filter unit 4. The algaecide solution bearing water is filtered and as a clarified water with the algaecide solution retained therein, discharged through the return line 8 for addition of the algaecide solution with water to the pool 1. With the connection to the inlet, the algaecide solution 14 is selected as a non-foaming, non-corrosive liquid. The majority of available algaecide solutions commercially available are of this characteristic and such specification does not adversely affect the system cost or result.

Although shown directly connected to the intake pipe 6 within the broadest concept of the present invention, the non-pressurized algaecide feeder assembly can be similarly mounted with the discharge injector unit secured to the discharge pipe 17 to the filter unit 4, or to the return pipe 8 of the assembly, such as shown in FIG. 4.

The present invention with the control valve unit 18 and the injector valve unit 16 provides a simple, reliable and cost effective algaecide supply for a swimming pool or the like. The replacement of the supply is readily provided by purchase of a conventional algaecide bottle which are normally formed of a suitable soft plastic. In use, the existing bottle 19 with the flexible flow line is removed from the holder. The new bottle is readily attached to the cap 29, which is inverted as a result of flexible lines 17, for connection to the inlet end of the valve body 26 of valve unit 18. The bottle 19 is then inverted and placed into the holder 22. The appropriate small hole is made in the bottle 19 and particularly the base wall thereof to allow free interchange with the surrounding atmosphere and thereby preventing vacuum forming within the bottle which would block on the gravity discharge of the water from the bottle.

The check valve unit 16 positively prevents back water flow into the feed assembly and maintains the algaecide solution 14 in a concentrated form, and further prevents loss of the water through the recycling system.

The present invention is readily applicable to both commercial and residential type installations. Thus, large institutional and commercial operations will normally operate with motor driven pumps of the three horsepower level while residential units will generally be on the order of one horsepower. The present invention provides a supply directly related to the period of pump operation and can be readily adjusted for either commercial or residential installations as necessary and desired.

Thus, with the present invention, even in an emptying of the supply very minimal air will at best be drawn into and mixed with the water and will not effect the operation of the pump unit or the desired water recycling through the system including the filter back to the pool. Further, clear tubing in the flow line as well as at least one significant clear wall portion of the supply container will result in immediate attention to the lack of algaecide solution in the feeder system.

The illustrated control valve unit in injector unit, which are preferred and particularly practical devices, may be provided in various other structure providing the desired flow rate control and positive one directional flow of a liquid algaecide solution to the recycle system of swimming pool.

The system as defined in the claims provides a cost effective and reliable system for automated feeding a liquid algaecide solution in a regulated manner to maintain an algae-free swimming pool, with minimal attention and effort.

Various modes of carrying out the invention are contemplated as being within the scope of the following claims particularly pointing out and distinctly claiming the subject matter which is regarded as the invention.

I claim:

1. An algaecide supply system for controlled addition of an algaecide solution to the water of a swimming pool having a water recycling system having a recycle flow water drawn from and returned to the pool via a pump unit, comprising a non-pressurized liquid algaecide solution supply unit having a discharge opening unit for gravity feed of solution therefrom, a control valve unit connected to said discharge opening unit providing a controlled flow of liquid algaecide solution from said supply unit and through said control valve unit, a flow line connected to said control valve unit and terminating adjacent a recycle flow line of said recycling system, a check valve injector unit connected to said control valve unit and having a discharge member secured to said recycle flow line and projecting inwardly with a discharge outlet located within said recycle flow line, said injector valve unit including a check valve biased to a closed position and positively preventing back flow from said discharge outlet backwardly through said check valve injector unit, said check valve responding to the operation of said pump unit and flow of recycle flow water to allow free gravity flow of the algaecide liquid solution from said supply unit downwardly through said control valve and said injector unit and into said recycled pool water for thorough intermixing therewith and addition to said swimming pool.

2. The supply system of claim 1 wherein said control valve unit includes an adjustable flow rate setting unit for setting controlled application of said liquid algaecide solution at least as low as one ounce in a twenty-four hours of pump operation to a plurality of ounces per twenty-four hours of pump operation.

3. The supply system of claim 1 wherein said supply unit includes a solution container including said discharge opening unit, said solution container having a capacity no larger than substantially one gallon, said injector unit having an inlet connected to said discharge opening unit, said injector unit mounted to said recycle flow line and having a conduit within an opening in said recycle flow line and terminating within said recycle flow line, said injector unit being mounted with a liquid tight connection at said opening in said recycle flow line.

4. A algaecide additive apparatus for supplying algaecide solution to a body of water including a swimming pool and including a water recycle flow system for withdrawing water from said body of water and returning said withdrawn water to said body of water, said apparatus including a supply container including a liquid algaecide solution and having an upper portion and a bottom portion, a discharge opening outlet connected to said bottom portion, a support for said container orienting said container with said discharge opening outlet located as a bottom member, said container having at least one vent opening in the upper portion of the container, said discharge opening outlet having a threaded neck, a flow control valve having an attachment cap for threadedly receiving of said neck in a sealed liquid tight connection, said flow control valve being adjustable to vary the rate of discharge of said algaecide solution, a flexible conduit connected to said discharge opening outlet and having an outer end, check valve unit connected to the outer end of said flexible conduit and restricting flow from the outer end of said flexible conduit, and an injector valve unit connected to said check valve unit and having a siphon tube adapted to be secured within the water recycle flow system.

5. An algaecide supply system for supplying an algaecide solution to a water pool having a water recirculating system including a series connected filter unit and pump unit, said pump unit having an inlet unit connected to said water pool, comprising a supply container for containing a liquid algaecide solution having a discharge outlet, a support for said container orienting said container with an upper portion and a lower portion and with said discharge outlet located in said lower portion as a bottom member, a control valve connected to said discharge outlet to discharge said algaecide solution, an injector valve unit connected to said control valve and to said inlet unit of said pump unit for supplying a mixture of said algaecide solution and said water to said filter unit, and a one-way flow unit connected to prevent flow of water from said recycling system into said container and responsive to flow of water in said water recycling system to establish free flow of said algaecide solution to said injector valve unit.

6. The algaecide supply system of claim 5, including a flow line connected to said pool and to said pump inlet and wherein said injector valve unit is located within said flow line.

7. The algaecide supply system of claim 5 wherein said supply container includes a non-pressurized liquid algaecide solution for gravity feed of solution therefrom, said control valve unit including an adjustable control for changing gravity flow of liquid algaecide solution from said container, and an injector valve unit including a check valve biased to a closed position, said check valve forming said one-way flow unit and positively preventing said back flow through said injector valve unit, said check valve having a movable member responsive to the operation of said pump unit to allow free gravity flow of the liquid algaecide solution from said container.

8. The algaecide supply system of claim 7 wherein said adjustable control for setting controlled application of said liquid algaecide solution at least as low as one ounce per twenty-four hours of pump operation to a plurality of ounces per twenty-four hours of pump operation.

9. The algaecide supply system of claim 7 including a recycle line connected between said pool and said inlet unit of said pump unit, and wherein said container is a replaceable bottle member having a bottom threaded neck form, said bottle having a capacity no greater than substantially one gallon, said control valve having a threaded connector secured to said neck and a flexible output line, said injector unit secured to said output line, said injector unit being mounted within said recycle line to said inlet unit of said pump unit with a liquid tight connection to said recycle line.

10. The algaecide supply system of claim 7 wherein said container includes an upper portion and at least one opening in the upper portion of the container, said discharge outlet formed by a threaded neck on the bottom wall of said container, said control valve having an attachment cap for threadedly receiving of said neck in a sealed liquid tight connection, said flow control valve being adjustable to vary the rate of discharge of said algaecide solution, a flexible conduit connected to said control valve, a check valve unit connected to the outer end of said flexible conduit, a flow line connected to said inlet unit of said pump unit, and said injector valve unit connected to said check valve and having a siphon tube extended into said flow line.

11. The supply system of claim 10 wherein said flow line includes a rigid pipe section having an opening to receive said siphon tube, said siphon tube having an inner wall conforming to the abutting pipe section and having an outer laterally extended wall, and a clamp member encircling said extended wall and said pipe section to secure said siphon tube in liquid-tight sealed engagement to said pipe section.

* * * * *

UNITED STATES PATENT AND TRADEMARK OFFICE
CERTIFICATE OF CORRECTION

PATENT NO. : 5,582,718
DATED : December 10, 1996
INVENTOR(S) : DONALD J. SOBCZAK It is certified that error appears in the above-identified patent and that said Letters Patent is hereby corrected as shown below:

COLUMN 10, LINE 23, CLAIM 9, AFTER "BOTTLE" INSERT ---MEMBER---.

Signed and Sealed this

Eighteenth Day of February, 1997

BRUCE LEHMAN

Attest:

*Attesting Officer*     *Commissioner of Patents and Trademarks*